Patented Jan. 16, 1940

2,187,695

UNITED STATES PATENT OFFICE 2,187,695

POLYSTYROL COMPOSITION

Sylvia M. Stoesser, Midland, Mich., assignor to The Dow Chemical Company, Midland, Mich., a corporation of Michigan No Drawing. Application July 1, 1937, Serial No. 151,548

6 Claims. (Cl. 260—36)

The present invention relates to compositions comprising polystyrene and particularly to liquid compositions suitable for lacquers and the like.

Polystyrene exhibits numerous properties which make it a very desirable synthetic resin. However, objects cast or molded from this material tend to become brittle and to become cloudy, i. e., "blush", on ageing. Likewise, thin films of polystyrene, when applied to metals, etc., as coating compositions, eventually become brittle and crack or peel. Furthermore, such films are not wholly impervious to aqueous solutions; that is, metal objects, even though coated with polystyrene, tend to corrode when in contact with aqueous solutions of electrolytes.

I have now discovered that when a halogenated diphenyloxide is incorporated as plasticizer in polystyrene, objects made from the plasticized polystyrene are very tough and do not "blush" even on long standing. Also, polystyrene plasticized with a halogenated diphenyloxide provides strongly adherent finishes on metals, etc., which exhibit little or no tendency to check or crack and are substantially impervious to aqueous solutions. The invention, then, consists in the new polystyrene compositions hereinafter fully described and particularly pointed out in the claims.

In preparing polystyrene compositions in accordance with the invention I prefer to use the tough resinous material produced by the polymerization of styrene at temperatures not exceeding 160° C. or thereabouts. However, other forms of polymerized styrene may also be utilized.

The halogenated diphenyloxides, i. e., the chlorinated and brominated diphenyloxides, all exert a plasticizing action on polystyrene. For most purposes, however, I prefer to use the polychlorinated diphenyloxides, especially those containing between 40 and 60 per cent by weight of chlorine. In preparing the plasticized material, chlorinated diphenyloxide and styrene may first be mixed and the mixture polymerized, or the plasticizer may be incorporated with already polymerized styrene.

The proportions of polystyrene and plasticizer may be varied widely, depending upon the use for which the material is intended. Thus, in making cast or molded objects, I prefer to use 0.5 to 2.0 parts by weight of a chlorinated diphenyloxide per 10 parts of polystyrene. However, in preparing coating compositions, I prefer to dissolve 1.0 to 10 parts of plasticizer and 10 parts of polystyrene in 50 to 200 parts of a suitable thinner. As thinner any relatively volatile organic liquid in which both polystyrene and the plasticizer are soluble, e. g., benzene, toluene, xylene, ethylbenzene, or mixtures thereof, may be employed. Ordinarily a mixture of solvents of different boiling points is preferred.

The polystyrene coating compositions just described are useful for application to metals, wood, etc., either on the bare surface or over a suitable undercoat, in any convenient way, such as spraying, dipping, or brushing on. They may, if desired, be modified by incorporating therein other plasticizers, dyes, pigments, drying oils, etc., to obtain varnishes and enamels of various types.

The following examples illustrate a number of ways in which the principle of the invention has been employed, but are not to be construed as limiting the scope thereof.

Example 1

10 parts by weight of styrene and 1 part of a chlorinated diphenyloxide having a composition corresponding to pentachlor-diphenyloxide were mixed and maintained at a temperature of 125° C. for 3 days. The polymerized material so produced was a tough, clear resin which remained unchanged even after long standing. A sample of unplasticized styrene polymerized under the same conditions become somewhat brittle and cloudy after a few weeks.

Example 2

Samples of plasticized polystyrene were prepared according to the procedure of Example 1, using the following compounds as plasticizers: dichloro-diphenyloxide, tetrachloro-diphenyloxide, hexachloro-diphenyloxide, and octachloro-diphenyloxide. The polymerized material in each case was a tough, clear resin which remained unchanged on prolonged standing. The sample containing the octachloro-diphenyloxide had a slight yellow color.

Example 3

A lacquer having the following composition was prepared:

| | Parts by weight |
|---|---|
| Polystyrene | 20 |
| Pentachloro-diphenyloxide | 10 |
| Benzene | 40.5 |
| Toluene | 121.5 |
| Xylene | 108.0 |

Clean metal strips were dipped in the lacquer, allowed to drain, and dried in an air bath at 65°

C. When these coated metal strips were bent through a 180° angle over a ¼-inch rod and then back to approximately their original shape, the plasticized polystyrene films did not crack or break away from the metal surface and showed little or no checking. Also when acidic copper sulfate solution was placed on both the flat and bent portions of the metal test strips, there was no evidence of any action, even after three hours.

In contrast, when strips of metal dipped in a polystyrene lacquer not containing the plasticizer were bent, the finishes checked badly. Moreover, when such strips were tested, as described above, with an acidic copper sulfate solution, bright metallic copper plated out within a few minutes on both the bent and unbent surfaces.

Similar lacquers were also prepared from compositions containing 10, 20, 30, and 40 per cent of the chlorinated diphenyloxide plasticizer in the plasticized polystyrene. Films from these lacquers likewise showed excellent corrosion resistance and adhesion to metal surfaces.

Other modes of applying the principle of our invention may be employed, change being made as regards the ingredients herein disclosed, provided the ingredients stated by any of the following claims or the equivalent of such stated ingredients be employed.

I therefore particularly point out and distinctly claim as my invention:

1. A resinous plastic composition consisting essentially of polystyrene and as a plasticizer therefor up to 10 parts by weight of a halogenated diphenyloxide per 10 parts of the polystyrene.

2. A resinous plastic composition consisting essentially of polystyrene and as a plasticizer therefor up to 10 parts by weight of a chlorinated diphenyloxide per 10 parts of the polystyrene.

3. A resinous plastic composition consisting essentially of polystyrene and as a plasticizer therefor up to 10 parts by weight of a chlorinated diphenyloxide containing between 40 and 60 per cent by weight of chlorine per 10 parts of the polystyrene.

4. A resinous plastic composition consisting essentially of polystyrene and as a plasticizer therefor between 0.5 and 2.0 parts by weight of a chlorinated diphenyloxide per 10 parts of the polystyrene.

5. A coating composition comprising as resinous ingredients polystyrene and as a plasticizer therefor between 1.0 and 10 parts by weight of a chlorinated diphenyloxide per 10 parts of the polystyrene, and an organic solvent.

6. A coating composition consisting essentially of 10 parts by weight of polystyrene, between 1.0 and 10 parts of a chlorinated diphenyloxide, and between 50 and 200 parts of an organic liquid selected from the class consisting of benzene, toluene, xylene, ethylbenzene, and mixtures thereof.

SYLVIA M. STOESSER.